(12) United States Patent
Gonzalez et al.

(10) Patent No.: US 11,240,284 B1
(45) Date of Patent: Feb. 1, 2022

(54) SYSTEMS AND METHODS FOR APPLICATION- AND CONTENT-AWARE REAL-TIME VIDEO ENCODING

(71) Applicant: Facebook, Inc., Menlo Park, CA (US)

(72) Inventors: Jose M Gonzalez, Los Altos, CA (US); Eric W Hwang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/886,762

(22) Filed: May 28, 2020

(51) Int. Cl.
*H04L 29/06* (2006.01)
*H04L 12/911* (2013.01)

(52) U.S. Cl.
CPC ............ *H04L 65/607* (2013.01); *H04L 47/82* (2013.01)

(58) Field of Classification Search
CPC .......... G06F 3/013; G06F 2203/04808; G06F 3/04812; G06F 16/48; G06F 40/117; G06F 16/583; G06F 11/323; H04L 65/607; H04L 47/83; H04L 47/82; H04L 47/803; H04L 47/805; H04N 21/23439; H04N 21/44008; H04N 13/178; H04N 21/84; B60K 2370/11; B60K 2370/186; G09G 2350/00
See application file for complete search history.

(56) References Cited

U.S. PATENT DOCUMENTS

| | | | | |
|---|---|---|---|---|
| 2009/0185981 | A1* | 7/2009 | Karczmar .............. | A61B 5/055 424/9.3 |
| 2009/0290807 | A1* | 11/2009 | Marchesotti ........... | H04N 9/643 382/261 |
| 2010/0040285 | A1* | 2/2010 | Csurka .................. | G06K 9/342 382/170 |
| 2012/0137301 | A1* | 5/2012 | Roslak .................. | H04M 15/88 718/103 |
| 2012/0213496 | A1* | 8/2012 | Rothschild ......... | H04N 21/2402 386/326 |
| 2012/0260179 | A1* | 10/2012 | Reshadi ................ | G06F 9/5061 715/735 |
| 2012/0326947 | A1* | 12/2012 | Fujiwaka .............. | G06F 3/1423 345/1.3 |
| 2014/0294094 | A1* | 10/2014 | Wu ................. | H04N 21/234309 375/240.26 |
| 2015/0006515 | A1* | 1/2015 | Hopkins ................. | G06F 17/30 707/722 |
| 2015/0146675 | A1* | 5/2015 | Zhang ............... | H04W 72/0406 370/329 |
| 2015/0264299 | A1* | 9/2015 | Leech ................... | G06F 3/0304 348/78 |

(Continued)

*Primary Examiner* — Backhean Tiv
*Assistant Examiner* — L T N.
(74) *Attorney, Agent, or Firm* — FisherBroyles, LLP

(57) ABSTRACT

The disclosed computer-implemented method may include (i) receiving a video stream for encoding, (ii) determining that the video stream is associated with an application, (iii) analyzing the video stream to label one or more regions of a frame within the video stream with a semantic category, (iv) determining, based at least in part on the application with which the video stream is associated, a prioritization of the semantic category, and (v) allocating encoding resources to one or more portions of the frame that comprise at least a part of the one or more regions of the frame based at least in part on the prioritization of the semantic category. Various other methods, systems, and computer-readable media are also disclosed.

18 Claims, 8 Drawing Sheets

(56) References Cited

U.S. PATENT DOCUMENTS

| | | | |
|---|---|---|---|
| 2016/0103923 A1* | 4/2016 | Thomas | G06F 40/117 715/234 |
| 2018/0024744 A1* | 1/2018 | Kim | G06F 3/0635 711/103 |
| 2018/0220119 A1* | 8/2018 | Horvitz | H04N 21/234363 |
| 2018/0357748 A1* | 12/2018 | Li | G06K 9/6212 |
| 2019/0080700 A1* | 3/2019 | Schug | G06K 9/6267 |
| 2019/0200084 A1* | 6/2019 | Gilson | H04N 21/4728 |
| 2020/0045687 A1* | 2/2020 | Lee | H04W 72/048 |

* cited by examiner

SYSTEMS AND METHODS FOR APPLICATION- AND CONTENT-AWARE REAL-TIME VIDEO ENCODING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
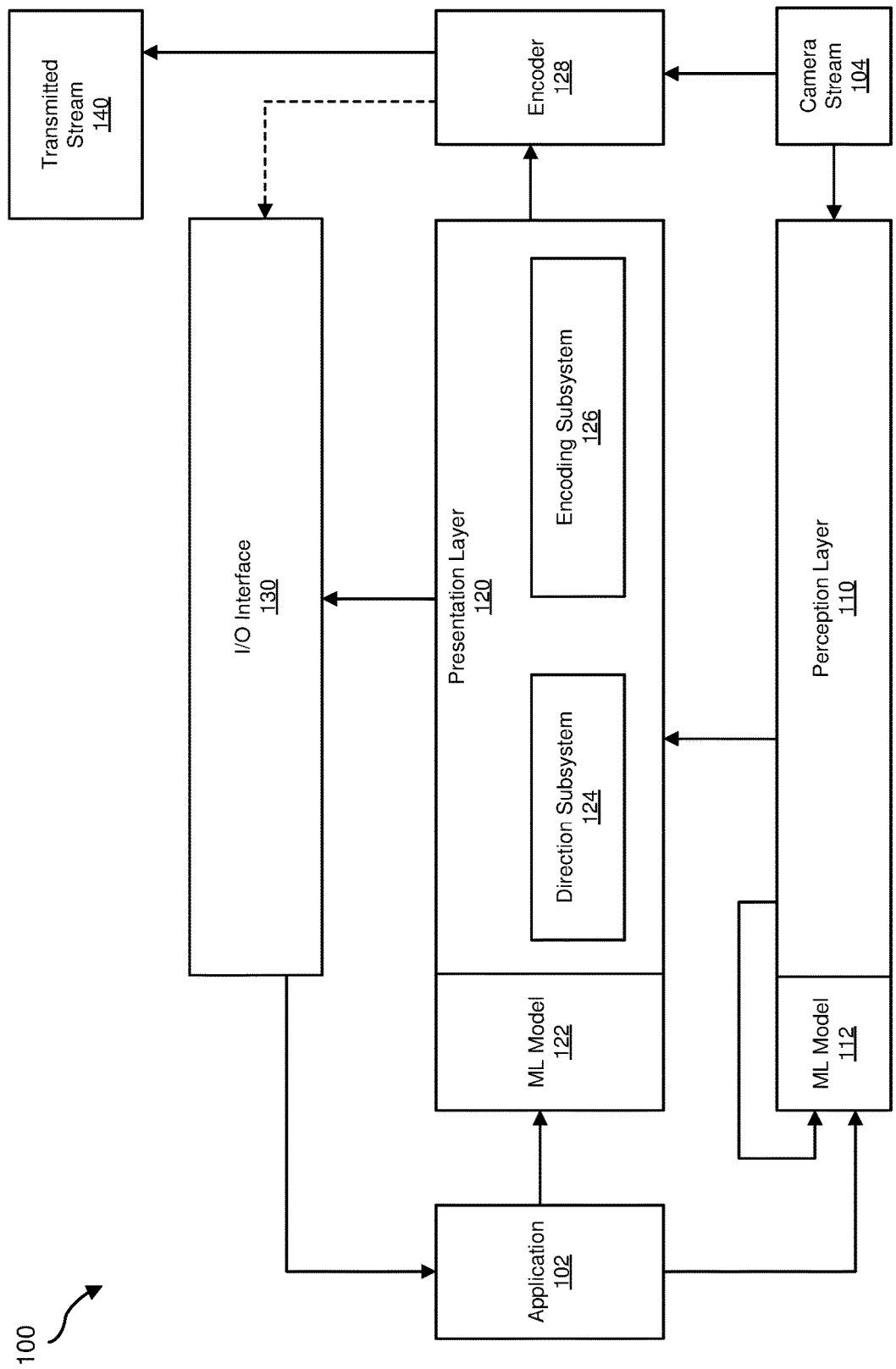
FIG. 1 is a block diagram of an exemplary system for application-aware real-time video encoding.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Streaming video can be resource-intensive in terms of network bandwidth and processing power. Accordingly, encoding a video stream (especially for real-time transmission) may involve reductions in bitrate and/or the use of compression techniques that sacrifice quality or speed and processing efficiency. To make the most of limited bandwidth and processing power, systems, such as those described herein, may identify content within video frames and devote more resources (e.g., more bits and/or more processing power) to portions of the video frames with relevant content. However, the same type of content may not always be equally relevant in all contexts. For example, people's faces may frequently be relevant in a video stream—however, in some contexts, other details may be more important, such as text or objects that a person is finely manipulating. By devoting resources to more faithful rendering of a person's face in a video stream, other elements that may be more important in context may be neglected or even sacrificed with lower-fidelity renderings. Accordingly, the systems and methods described herein may be application-aware to determine which content is relevant for the given context and may devote resources to improved quality of the content most relevant to the context.

By improving the encoding of video streams, the systems and methods described herein may improve the function of a computer tasked with encoding video streams. In addition, these systems and methods may improve the functioning of the computer by encoding more efficiently (directing computational resources to the most important parts of a video frame), thereby freeing processing resources on the computer. Further, these systems and methods may improve the functioning of a computer network by reducing the amount of bandwidth consumed to provide a quality video stream. Furthermore, these systems and methods may improve the function of a video streaming and/or conferencing system (that may include one or more purpose-built computing components as well as a camera, a microphone, etc.). Accordingly, these systems and methods represent an advancement in the fields of computing, video encoding, video streaming, and video conferencing.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is a block diagram of an exemplary system 100 for application-aware real-time video encoding. As shown in FIG. 1, system 100 may include a perception layer 110 and a presentation layer 120. In one example, an application 102 may produce, control, and/or use a camera stream 104 for transmission (e.g., for video conferencing). However, the bitrate of camera stream 104 may be too high for transmission. Accordingly, an encoder 128 may produce a transmitted stream 140 (e.g., modified and/or compressed with lossy compression) for transmission.

As used herein, the term "application" may refer to any of a variety of programs, modes, configurations, and/or contexts under which a video stream may be initiated, managed, edited, encoded, and/or transmitted. For example, application 102 may represent a program that includes video streaming functionality. In some examples, multiple different programs on a computing system may access the same video streaming functionality (e.g., application 102 may represent one of multiple applications that may access camera stream 104). For example, applications may include an application for remote learning that includes video streaming capabilities, a video chatting application for talking with family and friends in real time, and/or a hobbyist streaming application for sharing one's interests with others.

Additionally or alternatively, application 102 may represent one or more parameters (or the use thereof) that may configure and/or define the use of a video stream. Using the previous example, a single video streaming program may accept one or more parameters to perform the video streaming under different configurations. For example, a single video streaming program may accept parameters for remote learning, for video chatting, or hobbyist streaming, each of which may be considered a separate "application" as defined herein. In some examples, application 102 may represent one or more modes within a video streaming system and/or program. For example, while running a video streaming program and/or operating a video streaming system, a user may (e.g., via an I/O interface 130) switch modes (e.g., as above, between a remote learning mode, a video chatting mode, a hobbyist streaming mode), thereby customizing the operation of the program and/or the presentation of the video stream. Furthermore, in some examples application 102 may represent one or more contextual elements within and/or associated with the video stream that indicate the use of the video stream. For example, as will be described in greater detail below, parts of system 100 (e.g., perception layer 110) may identify semantic content within camera stream 104. System 100 may determine, based at least partly on the semantic content, application 102. As an example, perception layer 110 may identify many semantic elements within camera stream 104 related to food preparation (e.g., food preparation implements, a food preparation setting such as a kitchen, and/or food preparation activities such as cutting food, stirring, and/or other interactions with food and food preparation implements). Based on identifying the semantic elements, system 100 may determine application 102 as a food preparation streaming application.

Perception layer 110 may analyze camera stream 104 for one or more semantic elements within camera stream 104. For example, perception layer 110 may identify the locations of objects within camera stream 104 (such as people, tools, trees, or written text), constituent parts of objects (such as a person's face or hand, knobs on an oven, or the drawer of a desk), and/or events (such as a person writing or a person preparing food). In some examples, perception layer 110 may identify other aspects of the camera stream 104, such as a setting (conference room, kitchen, outdoors, etc.), a social characteristic (a business gathering, a family gathering, etc.), and/or any other aspect of camera stream 104 that may be relevant to human interest. In some examples, perception layer 110 may utilize a machine learning model 112 to identify semantic elements within the camera stream. Machine learning model 112 may include any suitable model or set of models capable of object detection and localization within a video stream, including, e.g., a region-based convolutional neural network and/or a regression-based object detector. In some examples, application 102 may select machine learning model 112 from among multiple models and/or may provide input to machine learning model 112 so that perception layer 110 focuses on semantic content within camera stream 104 that is relevant to application 102. Additionally or alternatively, perception layer 110, having identified semantic content, may replace, tune, adjust, and/or provide input to machine learning model 112 so that perception layer 110 focuses on semantic content that is relevant to application 102.

Presentation layer 120 may transform camera stream 104, resulting in a transmitted stream 140 (e.g., that is transmitted to one or more receiving client systems). Presentation layer 120 may determine how to modify camera stream 104 based at least in part on the semantic content identified in perception layer 110. For example, direction subsystem 124 may, as a part of presentation layer 120, modify a cropping of camera stream 104 to include and/or focus on identified semantic content. Additionally or alternatively, direction subsystem 124 may control one or more cameras that produce camera stream (e.g., by panning, tilting, rotating, and/or zooming the camera) to include and/or focus on identified semantic content. As described herein, presentation layer 120 may determine which identified semantic content is relevant to the camera stream 104 based on application 102. For example, presentation layer 120 may use a prioritization scheme to relate applications to the prioritization of certain semantic content. Thus, for example, if application 102 represents the use case of a video chat, presentation layer 120 may prioritize people and/or people's faces. If application 102 represents the use case of showing food preparation, presentation layer 120 may prioritize food items, food preparation implements, and food preparation activities. In some examples, presentation layer 120 may use a machine learning model 122 to determine, based on identified semantic content and application 102, which semantic content is relevant. For example, based on the relative locations and the particular combinations of various potentially relevant regions of semantic content in light of application 102, machine learning model 122 may determine which semantic content is most relevant. For example, in a food preparation context, machine learning model 122 may determine which food items and/or food preparation implements are most likely to be relevant to showcasing relevant food preparation activities.

Presentation layer 120 may also, via an encoding subsystem 126, direct the encoding of camera stream 104 to increase the quality of relevant semantic content, in light of application 102, within transmitted stream 140. For example, encoding subsystem 120 may receive locations within each frame of camera stream 104 of semantic content (as identified by perception layer 110), and may determine, based on application 102, which of the semantic content is relevant to application 102. As will be discussed in greater detail below, encoding subsystem 120 may then allocate resources to encoding portions of each video frame corresponding to the relevant semantic content (e.g., according to a degree of relevance and/or prioritization associated with the relevant semantic content in light of application 102).

Figure 2:
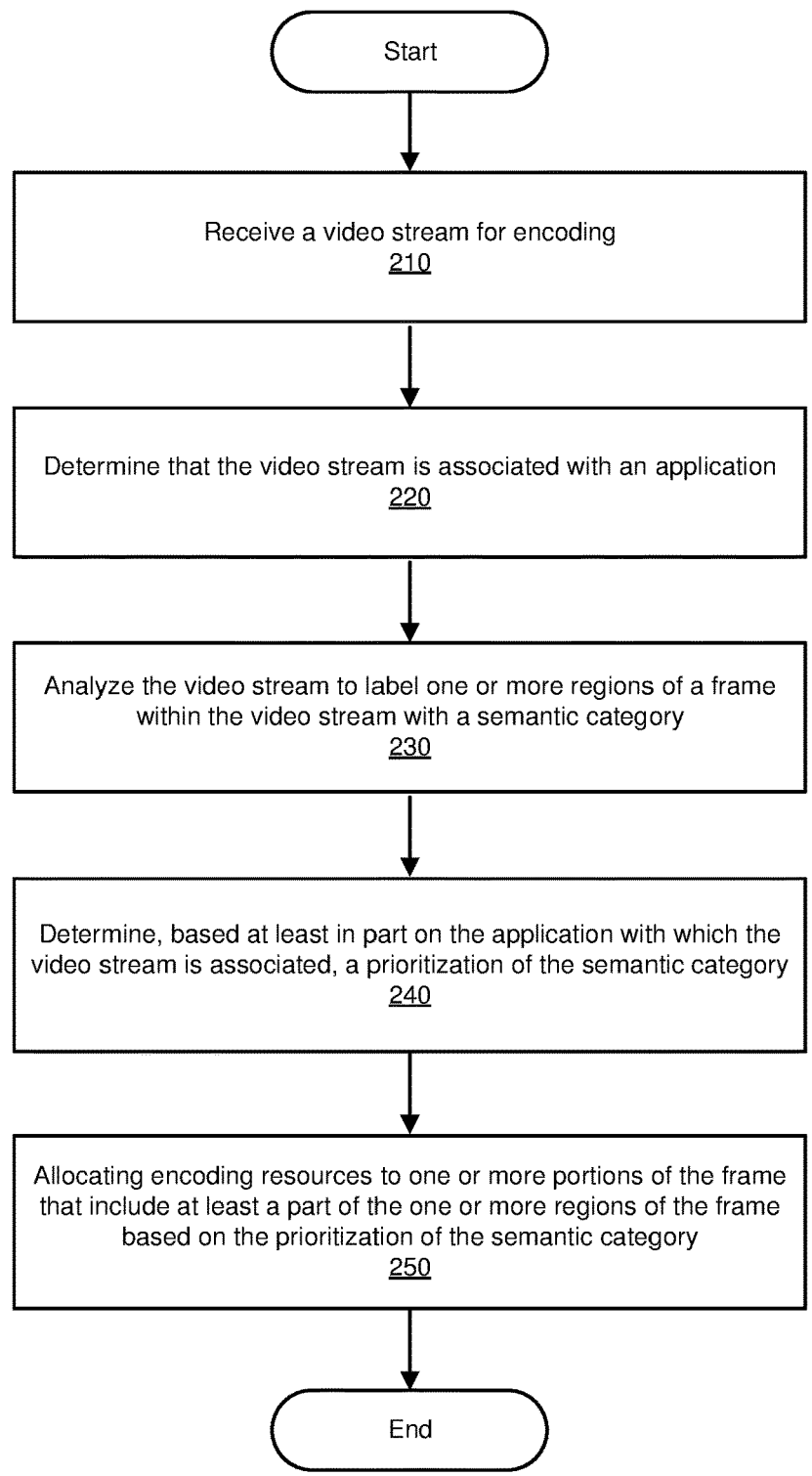
FIG. 2 is a flow diagram of an exemplary method for application-aware real-time video encoding.

FIG. 2 is a flow diagram of an exemplary computer-implemented method 200 for application-aware real-time video encoding. The steps shown in FIG. 2 may be performed by any suitable computer-executable code and/or computing system, including system 100 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may receive a video stream for encoding. The video stream may originate in any of a variety of contexts. For example, a video streaming and/or conferencing system may include a camera, a microphone, and a network interface device. In some examples, the bitrate of the video stream originating from the camera may be too high to reliably transmit to a client device (e.g., due to bandwidth constraints from the sending side and/or from the receiving side). Accordingly, systems described herein may set a lower target bitrate (e.g., based on an estimated, configured, and/or observed available bandwidth capacity) for encoding the video stream before transmitting the encoded video stream.

Returning to FIG. 2, at step 220 one or more of the systems described herein may determine that the video stream is associated with an application. The systems described herein may determine that the video stream is associated with the application in any of a variety of ways. For example, these systems may identify an application that initiated the video stream. Additionally or alternatively, these systems may identify an application with I/O access to the video stream. In some examples, these systems may identify an application that called an application programming interface (API) and/or otherwise sent a request to modify, encode, and/or transmit the video stream. As described earlier, in some examples the "application" may refer to a set of parameters (e.g., that identify a use case of the video stream). Accordingly, in these examples, the systems described herein may determine that the video stream is associated with the application by identifying and/or receiving the set of parameters. Similarly, as described earlier, in some examples the "application" may refer to a mode in which a video streaming program and/or system operates. In these examples, the systems described herein may determine that the video stream is associated with the application by identifying the mode in which the video streaming program and/or system is operating. Additionally or alternatively, as described earlier, in some examples the "application" may refer to contextual information within and/or associated with the video stream (e.g., that indicates a use case for the video stream). Accordingly, the systems described herein may determine that the video stream is associated with the application by identifying and/or analyzing the contextual information.

Returning to FIG. 2, at step 230 one or more of the systems described herein may analyze the video stream to label one or more regions of a frame within the video stream with a semantic category. In some examples, these systems may utilize a machine learning model to label one or more regions within the frame with a semantic category. Examples of semantic categories may include, without limitations, types of objects (e.g., a person, a person's face, a table, a whiteboard, written text, an apple, a pot, etc.) and actions (e.g., cutting an apple, writing text, sitting at a table, etc.). The machine learning model may include any suitable model or set of models capable of object detection and localization within a video stream, including, e.g., a region-based convolutional neural network and/or a regression-based object detector. In some examples systems described herein may select the machine learning model from among multiple models and/or may provide input to the machine learning model so that these systems may focus on semantic content within the video stream that is relevant to the application. Additionally or alternatively, these systems, having identified semantic content, may replace, tune, adjust, and/or provide input to the machine learning model so that the perception layer focuses on semantic content that is relevant to the application.

Returning to FIG. 2, at step 240 one or more of the systems described herein may determine, based at least in part on the application with which the video stream is associated, a prioritization of the semantic category. In one example, these systems may maintain a mapping between applications and prioritization levels of various semantic categories. Thus, for each given application, these systems may identify a set of defined prioritization levels for semantic categories. For example, a prioritization level for a person's face may be relatively high for a video chatting use case, while a prioritization level for a person's hands and for food items may be relatively high for a cooking demonstration use case. In some examples, there may be two levels of prioritization (e.g., a "no prioritization" level as a baseline and a "priority" level for semantic categories identified as relevant to the application). In other examples, there may be more than two levels of prioritization (e.g., defining various weights to apply to one or more formulas for allocating resources to encoding a portion of a video frame). In some examples, the systems described herein may define low priority semantic categories for an application, as the semantic category may be regarded as likely irrelevant to the application. For example, elements that are likely to be background elements for a given application may be assigned a low priority.

Returning to FIG. 2, at step 250 one or more of the systems described herein may allocate encoding resources to one or more portions of the frame that include at least a part of the one or more regions of the frame based on the prioritization of the semantic category. For example, these systems may allocate encoding resources to superblocks of the frame that contain portions of regions of the frame corresponding to a semantic category according to an application-aware prioritization of the semantic category. In some examples, encoding resources may be allocated to a superblock according to the highest priority level of semantic content found in the superblock. In other examples, encoding resources may be allocated to a superblock according to the proportions of the superblock containing semantic content of various priority levels.

The systems described herein may allocate various encoding resources to a portion (e.g., superblock) of a frame. For example, a video stream may have a target bitrate, leaving a defined budget for bits per frame. Accordingly, the systems described herein may allocate a disproportionately large budget for bits in a prioritized superblock, allowing for a higher fidelity rendering of the content (e.g., due to a lower level of information loss) in the superblock that is relevant to the application.

As another example the systems described herein may allocate an amount of processing power to encoding a superblock based on the prioritization of the superblock. For example, these systems may perform a more computationally expensive compression technique for prioritized superblocks that results in a higher fidelity rendering of the content. Because processing resources may be limited, these systems may perform computationally less expensive compression techniques on less prioritized superblocks.

In some examples, the systems described herein may pass information about regions with relevant semantic content to a codec so that the codec may more efficiently and effectively improve the quality of the encoded regions. For example, by identifying the locations of relevant semantic elements within each frame of the video stream and passing the locations to the codec, the codec may reduce the cost of motion search operations that may otherwise be performed by the codec. For example, by passing location and/or motion information to the codec these systems may reduce the cost of performing a motion vector search.

The systems described herein may encode the video stream according to the encoding resources allocated to each superblock of each frame and may transmit the video stream to one or more client systems, along with information about how the superblocks of each frame were encoded so that the client systems can decode the superblocks accordingly.

Figure 3:
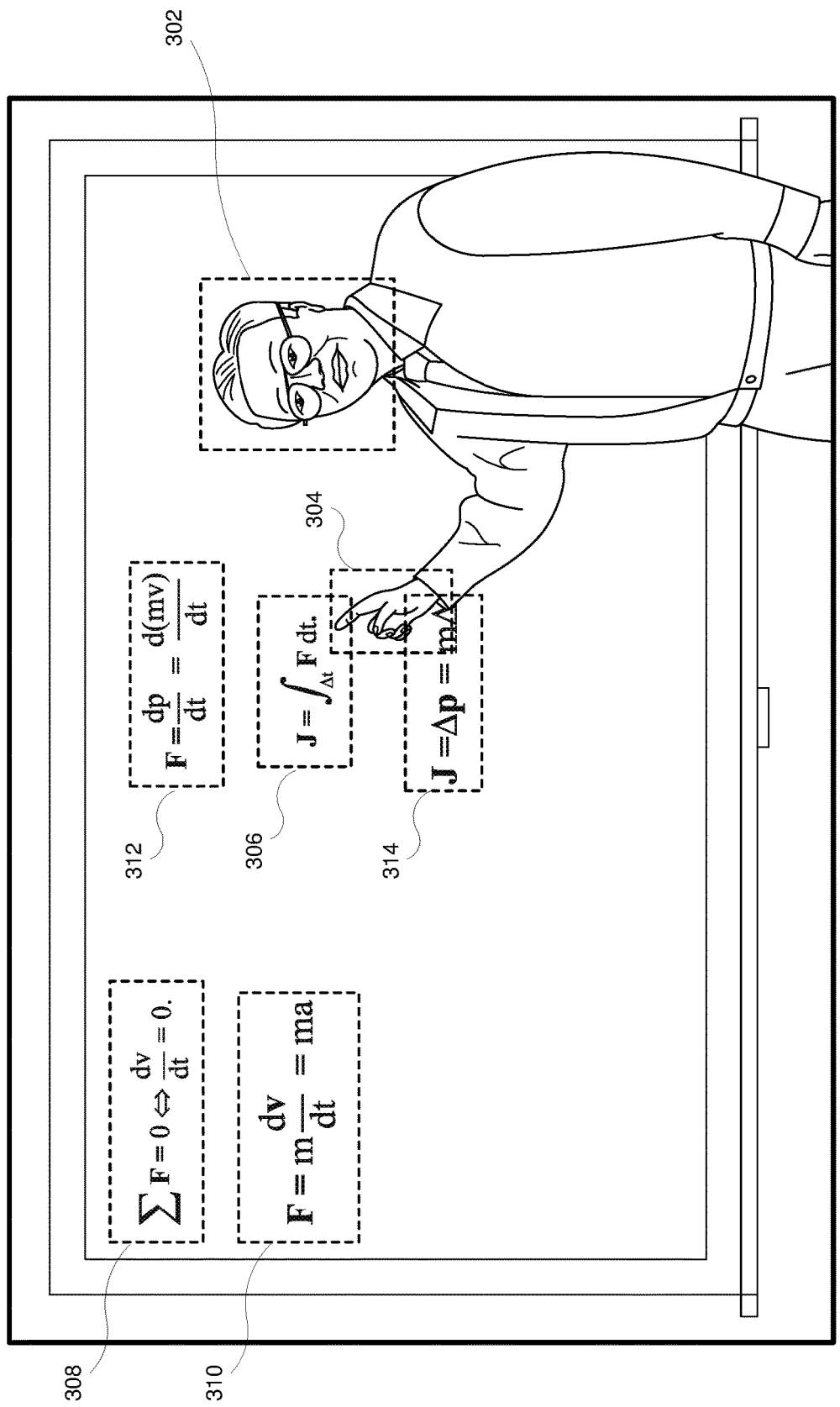
FIG. 3 is an illustration of an exemplary semantically tagged video frame.

FIG. 3 is an illustration of an example semantically tagged video frame to which the systems described herein may apply the methods described herein. As shown in FIG. 3, the video stream may show a person in front of a whiteboard with writing on it. Accordingly, in some examples, the systems described herein may identify various semantic elements within the video frame. For example, these systems may identify a face region 302, a hand region 304, and written text regions 306, 308, 310, 312, and 314. These systems may associate the locations of these regions with the respective semantic identifications. The relative importance of the various semantic elements may depend at least in part on an application associated with the video stream. Accordingly, the systems described herein may determine a prioritization of each region based at least in part on the application.

Figure 4:
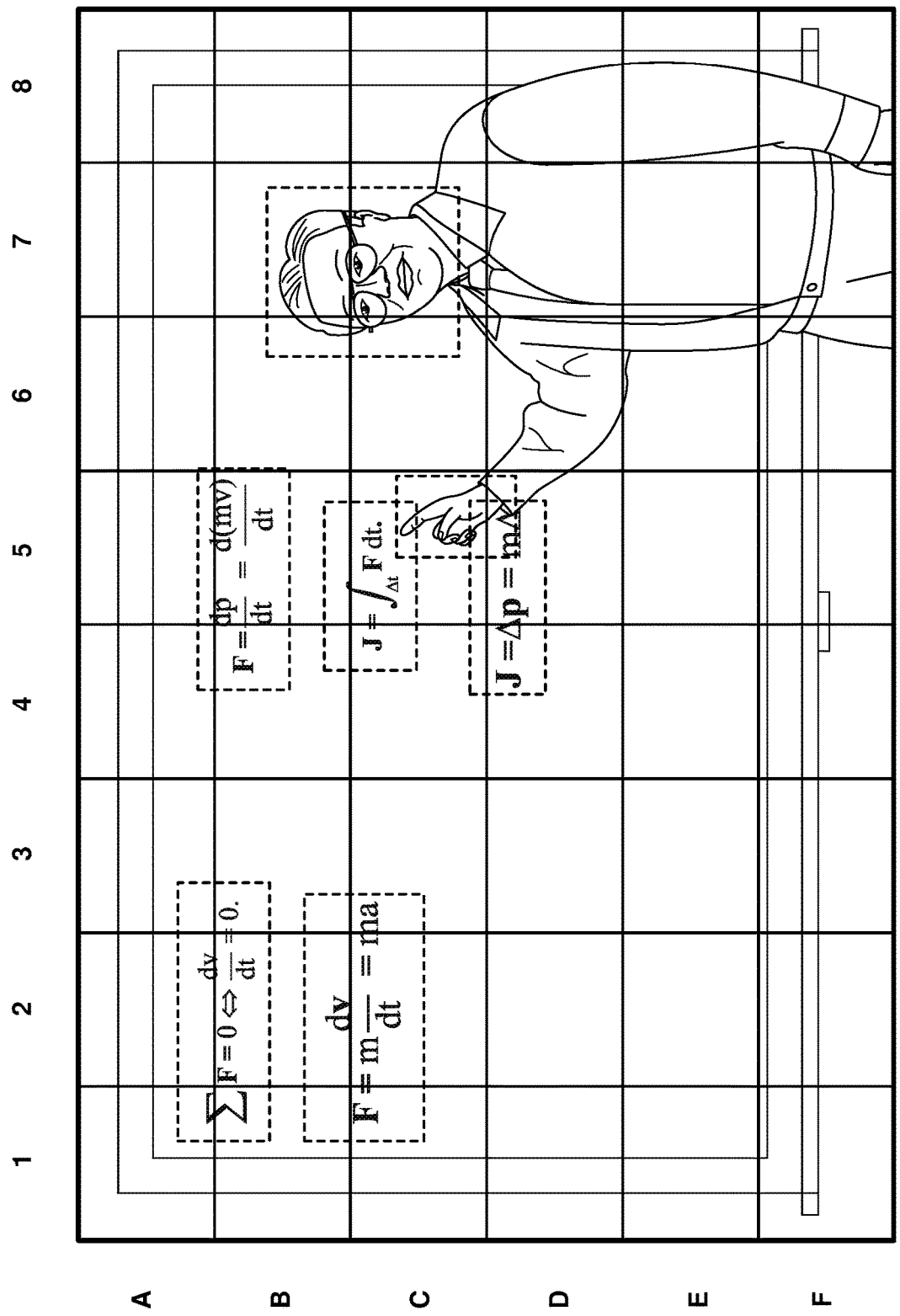
FIG. 4 is an illustration of blocks of the exemplary semantically tagged video frame of FIG. 3.

FIG. 4 is an illustration of the semantically tagged video frame of FIG. 3 divided into 48 superblocks. As can be seen in FIG. 4, the tagged regions of FIG. 3 may correspond to one or more superblocks. Accordingly, the systems described herein may attribute the prioritization of the tagged regions of FIG. 3 to the superblocks containing them.

For example, the face region 302 from FIG. 3 may correspond to superblocks B6, B7, C6, and C7. Accordingly, the systems described herein may attribute the prioritization corresponding to the face region 302 to superblocks B6, B7, C6, and C7. Similarly, the written text region 306 from FIG. 3 may correspond to superblocks B4, B5, C4, and C5. Accordingly, the systems described herein may attribute the prioritization corresponding to the written text region 306 to superblocks B4, B5, C4, and C5. Superblock C5 also includes portions of the hand region 304 and the written text region 314. Thus, the prioritization of hand region 304 and/or written text region 314 may influence or instead determine the prioritization of superblock C5. For example, superblock C5 may be assigned the highest prioritization from among written text region 306, hand region 304, and written text region 314. As will be described below in relation to FIGS. 5 and 6, the prioritization of the superblocks based on the various regions may depend on the prioritization attributed to the various regions based on the application associated with the video stream.

Figure 5:
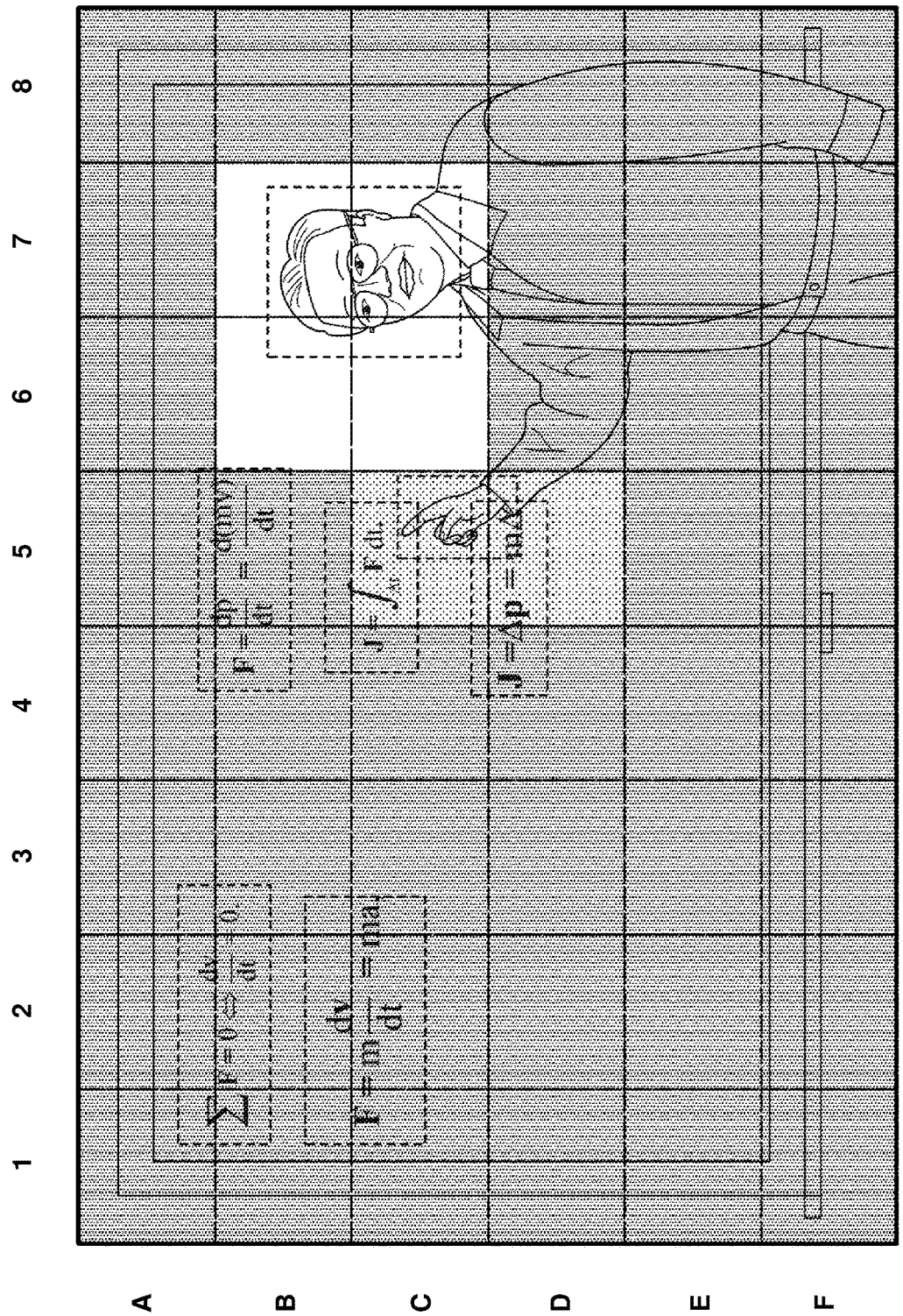
FIG. 5 is an illustration of application-based weighting of the blocks of FIG. 4 in light of the semantic tagging.

FIG. 5 shows an application-based weighting of the superblocks of FIG. 4 according to the semantic tagging of the identified regions of FIG. 3. For example, human features may be most relevant to the application (e.g., a video chat use case). Accordingly, the systems described herein may identify the face as most relevant to the application and the hand as also relevant to the application. Thus, systems described herein may assign superblocks B6, B7, C6, and C7, containing the face, with the highest priority. These systems may assign superblocks C5 and D5, containing the hand, with a moderate priority. Other superblocks may have a baseline, lower priority by default.

Figure 6:
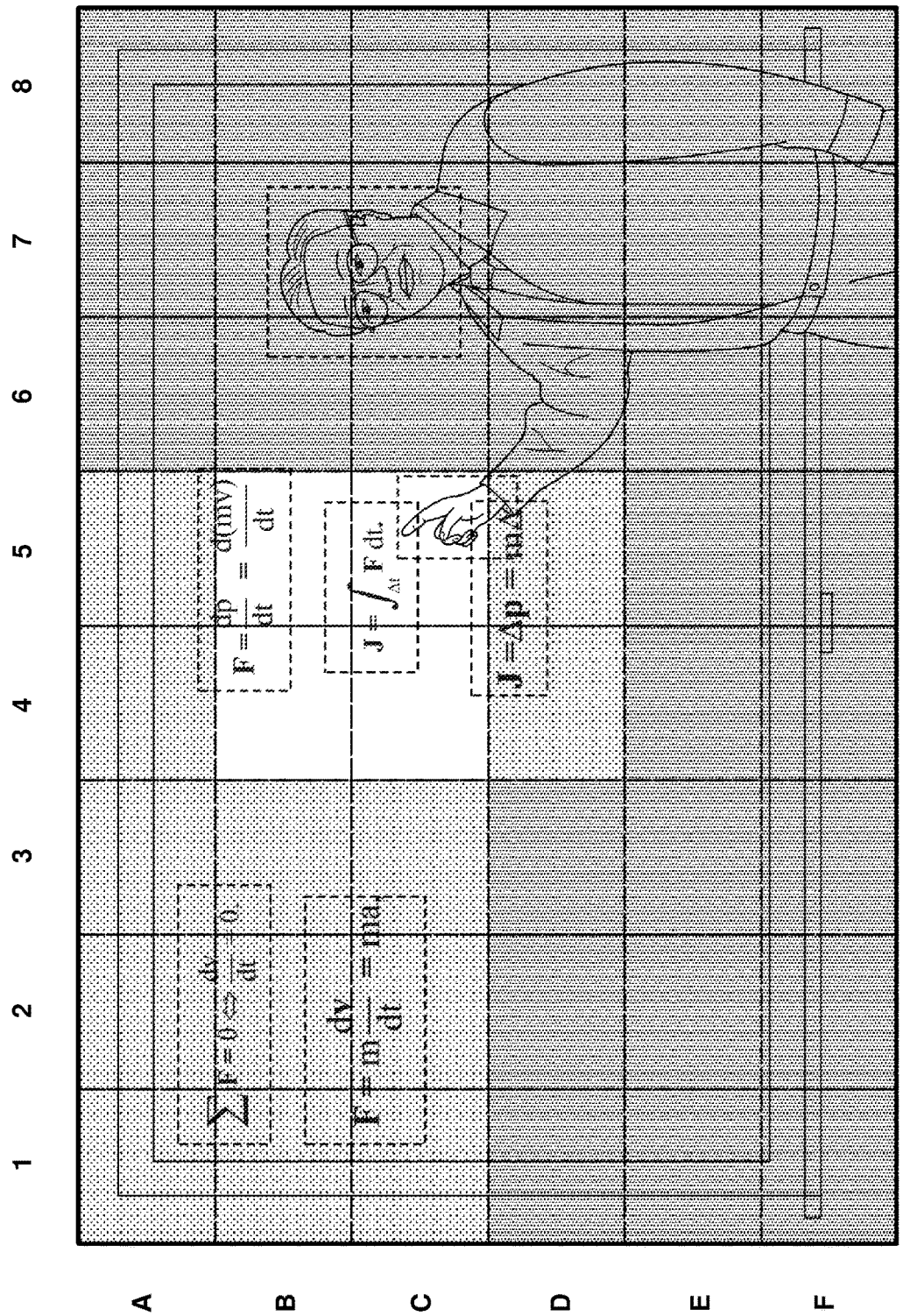
FIG. 6 is an illustration of an alternative application-based weighting of the blocks of FIG. 4 in light of the semantic tagging.

FIG. 6 shows an application-based weighting of the superblocks of FIG. 4 based on a different application. For example, written text may be most relevant to the application (e.g., a remote learning use case). Accordingly, the systems described herein may identify the written text regions of FIG. 3 as most relevant to the application. In one example, these systems may identify written text region 306 as the most relevant. For example, the systems described herein may identify written text region 306 as having been the most recently written text, the only text observed to be written during the video stream, and/or the text current indicated by the gesture of hand 304. Accordingly, while the systems described herein may assign superblocks A1-A5, B1-B3, C1-C3, and D4-D5 with a moderate priority level, they may assign superblocks B4-B5 and C4-C5 with a highest priority level.

As may be appreciated, although the content of the video frame shown in FIGS. 5 and 6 may be identical, the systems described herein may prioritize the content differently based on the relevance of the content to the application associated with the video stream. In this manner, where the video stream is primarily used for social connection, the face may be encoded at a high quality, whereas where the video stream is primarily used for instruction, the written text may be encoded at a high quality. Absent application-aware prioritization, a viewer may be frustrated to not clearly see the face in the social context or may be frustrated that the text is not clearly legible in the instructive context.

Figure 7:
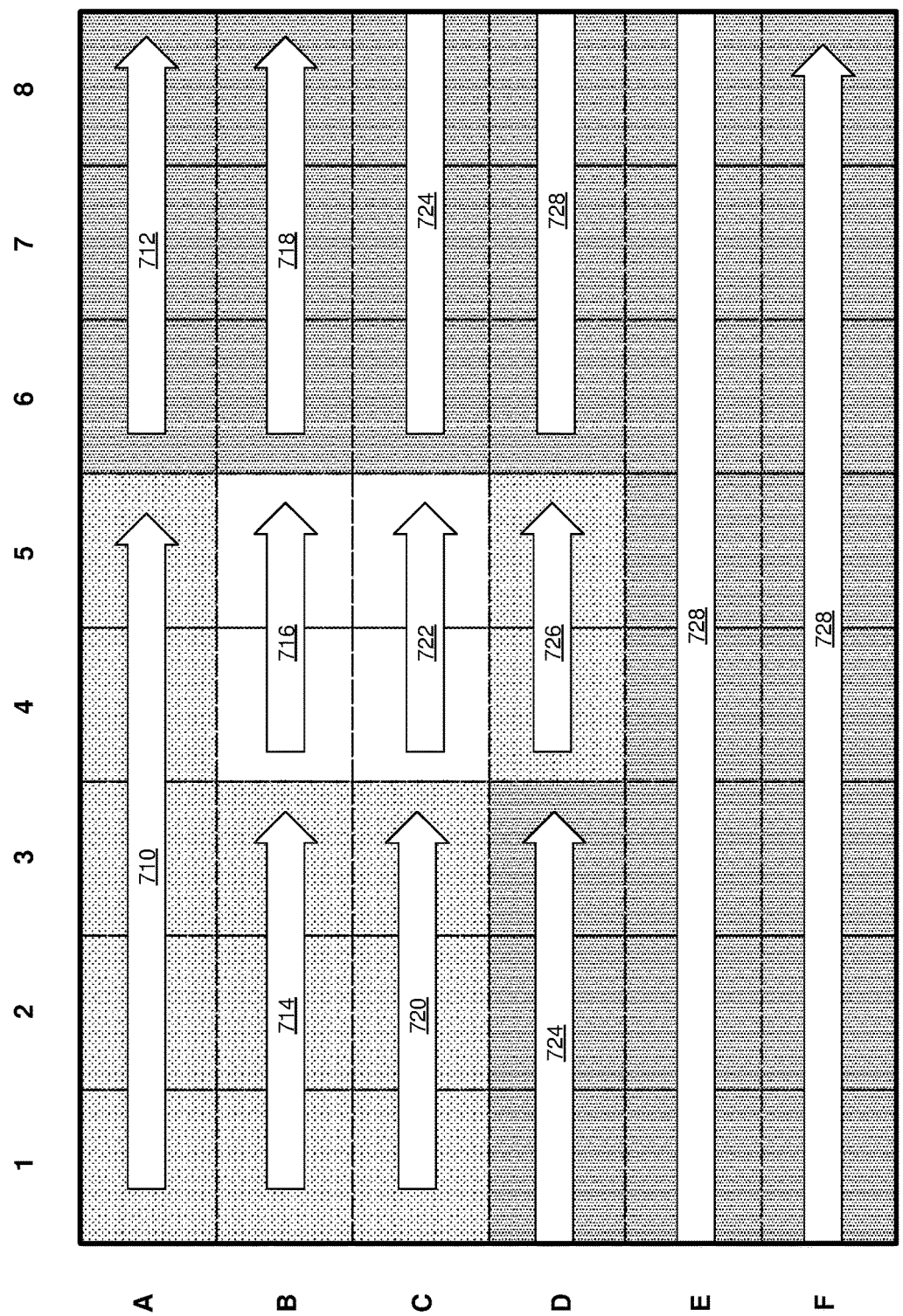
FIG. 7 is an illustration of an exemplary one-pass process for adaptively encoding the semantically tagged video frame of FIG. 3 according to the application-based weighting of FIG. 6.

FIG. 7 illustrates a single pass encoding process for the video frame as prioritized in FIG. 6. In one example, the systems described herein may identify a target bitrate for the video stream, and, accordingly, a target number of bits for the video frame. If each superblock had the same priority, the systems described herein could target approximately 1/48 of the bits when encoding each superblock, adjusting that target upward if currently under budget for the frame based on the superblocks already encoded or adjusting that target downward if currently over budget. However, because the superblocks do not have the same priority, the systems described herein may target a number of bits for each superblock based at least in part on a prioritization weighting of that superblock. In one approach, each superblock may be assigned a weighted proportion of the total video frame (such that the sum of the weighted proportions is 1), and the target for each superblock may be adjusted upward or downward depending on whether the budget for the frame is currently over or under target. In another approach, each group of superblocks with a common priority level may be allocated a separate budget proportionate to their number and their priority (such that the sum of the budgets is the target budget of the entire video frame), and the systems described herein may adjust the target for each superblock upward or downward depending on whether the budget for the group with the common priority level is currently over or under target.

As shown in FIG. 7, the systems described herein may first perform an encoding sequence 710 at a moderate priority level, adjusting the bit target for each successive superblock based on the remaining budget. These systems may then perform an encoding sequence 712 at a lower priority level, again adjusting bit targets for successive superblocks based on the remaining budget. These systems may then perform an encoding sequence 716 at a high priority level, again adjusting bit targets for successive superblocks based on the remaining budget. In succession, the systems described herein may perform encoding sequences 718, 720, 722, 724, 726, and 728, adjusting bit targets for successive superblocks accordingly.

Figure 8:
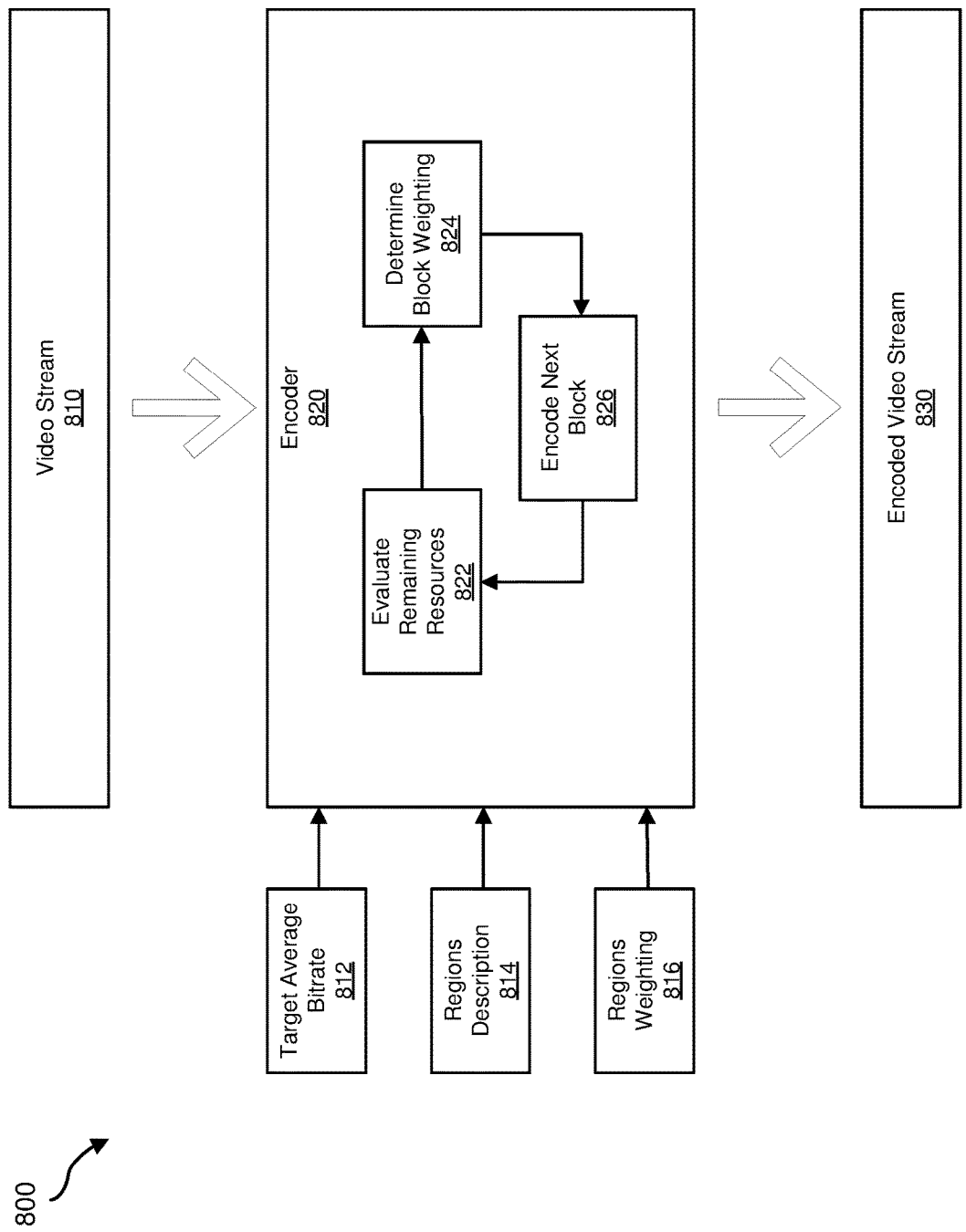
FIG. 8 is a block diagram of a system for application- and content-aware adaptive encoding of a video frame in one pass.

FIG. 8 illustrates a system 800 for application- and content-aware adaptive rate control. As shown in FIG. 8, a target average bitrate, a regions description 814 (providing, e.g., the locations of regions of semantic content), and a regions weighting 816 may be provided as input to an encoder 820 along with a video stream 810. Encoder 820 may, for each frame, perform steps 822, 824, and 826 in a cycle until the superblocks of the frame have been encoded. Thus, for example, at step 822 these systems may evaluate the remaining resources for encoding the video frame (e.g., the number of bits remaining in a budget to devote to the video frame given target bit rate 812, the amount of processing power remaining to devote to the video frame, etc.). At step 824 these systems may determine the weighting of the next superblock to encode. At step 826 these systems may encode the next block of the video frame according to the weighting assigned to the frame.

By way of further example to the processes described above in connection with FIGS. 7 and 8, in one example the systems described herein may assign two levels of priority (e.g., regions that are of interest and regions that are not of particular interest). In this example, an encoding request may include an average bitrate X. The encoding request may also include a description of a region of interest. From the size of the region of interest compared to the total frame size, the systems described herein may calculate the relative ratio p of the region of interest vs. frame outside the region of interest. The encoding request may also include a factor indicating how important is the region of interest compared to the frame outside the region of interest, measured as the relative increase kin bitrate for the region of interest compared to area outside the region of interest. In one example, the systems described herein may split the expected bitrate X according to Equation (1):

$$X = p*(k*b) + (1-p)*b \qquad (1)$$

where b is the actual bitrate for the area outside the region of interest. Therefore, the bitrates used for the region of interest and for the area outside the region of interest may be determined according to Equations (2) and (3), respectively:

$$k*b \qquad (2)$$

$$b = X/(k*p + 1 - p) \qquad (3)$$

For example, in a frame with 40 blocks, 4 blocks may be selected as corresponding to the region of interest (p=0.1). With an importance factor of k=2 and a bitrate of X=1 Mbps, the systems described herein may budget b=0.9 Mbps for the area outside the region of interest and 1.8 Mbps for the region of interest.

In another example, a video frame may include N (more than two) regions with varying levels of priority. In this case, the systems described herein may divide the total budget in N parts, one covering each of the different regions. Thus, for example, these systems may maintain a budget for a region containing faces (to be encoded at a very good quality level), another budget for a region containing trees (to be encoded at a lower quality level), and another budget for a baseline/uncategorized region, etc. The systems described herein may then use an adaptive rate mechanism applied separately to each part with a different priority level.

In this case, each region may be characterized by an importance factor $k_i$ and an actual region of interest description, resulting in a frame ratio $p_i$. The systems described herein may therefore divide the expected bitrate X for the video frame according to Equation (4):

$$X = \sum_{i=1}^{N} p_i * (k_i * b) \qquad (4)$$

Therefore, the bitrate for the ith zone is $k_i*b$, according to Equation (5):

$$b = \frac{X}{\sum_{i=1}^{N} p_i * k_i} \qquad (5)$$

By way of another example, the systems described herein may compute the ratio of bitrate allocation for each region by configuring the relative weights $w_i$ for each region i, according to Equation (6):

$$Ri = (p_i * w_i)/(p_1 * w_1 + p_2 * w_2 + \ldots + p_n * w_n)$$

If a region A has double the encoding density of region B, then region A has $w_A=2$, while region B has $w_B=1$. Thus, the bandwidth allocated to that region is X*R.

It may be appreciated that the approaches described above are compatible with existing rate-control mechanisms and may be combined with them. For example, a rate-control mechanism may modulate the quantization parameter (QP) value on a per macroblock basis based on the frame type (I-, P-, or B-frames) using three state variables that are updated at every block or frame. Thus, the systems described herein may apply such a rate-control mechanism separately for each region of interest.

EXAMPLE EMBODIMENTS

Example 1

A computer-implemented method for application- and content-aware video stream encoding may include (i) receiving a video stream for encoding, (ii) determining that the video stream is associated with an application, (iii) analyzing the video stream to label one or more regions of a frame within the video stream with a semantic category, (iv) determining, based at least in part on the application with which the video stream is associated, a prioritization of the semantic category, and (v) allocating encoding resources to one or more portions of the frame that comprise at least a part of the one or more regions of the frame based at least in part on the prioritization of the semantic category.

Example 2

The computer-implemented method of Example 1, further including (i) receiving an additional video stream for encoding, (ii) determining that the additional video stream is associated with an additional application, (iii) analyzing the additional video stream to label one or more additional regions of an additional frame within the additional video stream with the semantic category, and (iv) determining, based at least in part on the additional application with which the additional video stream is associated, an additional prioritization of the semantic category, the additional prioritization of the semantic category differing from the prioritization of the semantic category based at least in part on the additional application differing from the application.

Example 3

The computer-implemented method of Example 1, further including (i) receiving an additional video stream for encoding, (ii) determining that the additional video stream is associated with the application, (iii) analyzing the additional video stream to label one or more additional regions of an additional frame within the additional video stream with an additional semantic category, and (iv) determining, based at least in part on the application with which the additional video stream is associated, an additional prioritization of the additional semantic category, the additional prioritization of the additional semantic category differing from the prioritization of the semantic category based at least in part on the additional semantic category differing from the semantic category.

Example 4

The computer-implemented method of Example 1, where determining that the video stream is associated with the application includes at least one of (i) identifying an application that initiated the video stream, or (ii) identifying one or more parameters defining a use of the video stream.

Example 5

The computer-implemented method of Example 1, wherein allocating encoding resources to the one or more portions of the frame that based at least in part on the prioritization of the semantic category comprises performing a compression on the one or more portions of the frame, wherein the compression involves a compression scheme with a lower degree of information loss as a degree of prioritization increases.

Example 6

The computer-implemented method of Example 1, wherein allocating encoding resources to the one or more portions of the frame that based at least in part on the prioritization of the semantic category comprises performing a compression one the one or more portions of the frame, wherein the compression involves a compression scheme that selects one or more compression techniques that consume increasingly more processing resources as a degree of prioritization increases.

Example 7

The computer-implemented method of Example 1, wherein allocating encoding resources to the one or more portions of the frame that based at least in part on the prioritization of the semantic category comprises providing information about motion of one or more elements within the one or more regions of the frame to a codec that encodes the video stream, wherein the codec uses the information about the motion of the elements to reduce improve the fidelity of the one or more elements within the video stream.

Example 8

The computer-implemented method of Example 1, further including encoding the frame using the allocated encoding resources and transmitting the video stream with the encoded frame in real-time.

Example 9

The computer-implemented method of Example 1, further including (i) identifying one or more encoding parameters resulting from the allocated encoding resources used to encode the frame, and (ii) transmitting the one or more encoding parameters to a client system that receives the video stream for decoding the frame.

Example 10

The computer-implemented method of Example 1, wherein allocating encoding resources to the one or more portions of the frame that based at least in part on the prioritization of the semantic category comprises encoding blocks of the frame sequentially, wherein a number of bits targeted for encoding each successive block is determined based on (i) a target number of bits for the frame, (ii) a number of bits already consumed in encoding blocks of the frame, and (iii) a prioritization for each given block based on a prioritization of one or more semantic categories associated with each given block.

As detailed above, the computing devices and systems described and/or illustrated herein broadly represent any type or form of computing device or system capable of executing computer-readable instructions. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a video stream to be transformed, transform the video stream, and output a result of the transformation to transmit the video stream. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving a video stream, associated with an application, for encoding;
labeling one or more regions of a frame within the video stream with a semantic category;
determining, based at least in part on a mapping between the application with which the video stream is associated and the semantic category, an application-based prioritization of the semantic category for the application;
allocating encoding resources to one or more portions of the frame that comprise at least a part of the one or more regions of the frame based at least in part on the application-based prioritization of the semantic category for the application;
receiving an additional video stream for encoding;
determining that the additional video stream is associated with an additional application;
analyzing the additional video stream to label one or more additional regions of an additional frame within the additional video stream with the semantic category; and
determining, based at least in part on a mapping between the additional application with which the additional video stream is associated and the semantic category, an additional application-based prioritization of the semantic category for the application, the additional application-based prioritization of the semantic category differing from the application-based prioritization of the semantic category based at least in part on the mapping between the additional application and the semantic category differing from the mapping between the application and the semantic category.

2. The computer-implemented method of claim 1, further comprising:
receiving an additional video stream for encoding;
determining that the additional video stream is associated with the application;
analyzing the additional video stream to label one or more additional regions of an additional frame within the additional video stream with an additional semantic category; and
determining, based at least in part on a mapping between the application with which the additional video stream is associated and the additional semantic category, an additional application-based prioritization of the additional semantic category, the additional application-based prioritization of the additional semantic category differing from the application-based prioritization of the semantic category based at least in part on the mapping between the application and the additional semantic category differing from the mapping between the application and the semantic category.

3. The computer-implemented method of claim 1, wherein determining that the video stream is associated with the application comprises at least one of:
identifying an application that initiated the video stream; or
identifying one or more parameters defining a use of the video stream.

4. The computer-implemented method of claim 1, wherein allocating encoding resources to the one or more portions of the frame based at least in part on the application-based prioritization of the semantic category comprises performing a compression on the one or more portions of the frame, wherein the compression involves a compression scheme with a lower degree of information loss as a degree of application-based prioritization increases.

5. The computer-implemented method of claim 1, wherein allocating encoding resources to the one or more portions of the frame based at least in part on the application-based prioritization of the semantic category comprises performing a compression on the one or more portions of the frame, wherein the compression involves a compression scheme that selects one or more compression techniques that consume increasingly more processing resources as a degree of application-based prioritization increases.

6. The computer-implemented method of claim 1, wherein allocating encoding resources to the one or more portions of the frame based at least in part on the application-based prioritization of the semantic category comprises providing information about motion of one or more elements within the one or more regions of the frame to a codec that encodes the video stream, wherein the codec uses the information about the motion of the one or more elements to improve a fidelity of the one or more elements within the video stream.

7. The computer-implemented method of claim 1, further comprising encoding the frame using the allocated encoding resources and transmitting the video stream with the encoded frame in real-time.

8. The computer-implemented method of claim 1, further comprising:
identifying one or more encoding parameters resulting from the allocated encoding resources used to encode the frame; and
transmitting the one or more encoding parameters to a client system that receives the video stream for decoding the frame.

9. A system comprising:
at least one physical processor;
physical memory comprising computer-executable instructions that, when executed by the physical processor, cause the physical processor to:
receive a video stream, associated with an application, for encoding;
label one or more regions of a frame within the video stream with a semantic category;
determine, based at least in part on a mapping between the application with which the video stream is associated and the semantic category, an application-based prioritization of the semantic category for the application;
allocate encoding resources to one or more portions of the frame that comprise at least a part of the one or more regions of the frame based at least in part on the application-based prioritization of the semantic category for the application;
receive an additional video stream for encoding;

determine that the additional video stream is associated with an additional application;

analyze the additional video stream to label one or more additional regions of an additional frame within the additional video stream with the semantic category; and determine, based at least in part on a mapping between the additional application with which the additional video stream is associated and the semantic category, an additional application-based prioritization of the semantic category for the application, the additional application-based prioritization of the semantic category differing from the application-based prioritization of the semantic category based at least in part on the mapping between the additional application and the semantic category differing from the mapping between the application and the semantic category.

10. The system of claim 9, wherein the computer-executable instructions further cause the physical processor to:

receive an additional video stream for encoding;

determine that the additional video stream is associated with the application;

analyze the additional video stream to label one or more additional regions of an additional frame within the additional video stream with an additional semantic category; and determine, based at least in part on a mapping between the application with which the additional video stream is associated and the additional semantic category, an additional application-based prioritization of the additional semantic category, the additional application-based prioritization of the additional semantic category differing from the application-based prioritization of the semantic category based at least in part on the mapping between the application and the additional semantic category differing from the mapping between the application and the semantic category.

11. The system of claim 9, wherein determining that the video stream is associated with the application comprises at least one of:

identifying an application that initiated the video stream; or identifying one or more parameters defining a use of the video stream.

12. The system of claim 9, wherein allocating encoding resources to the one or more portions of the frame based at least in part on the application-based prioritization of the semantic category comprises performing a compression on the one or more portions of the frame, wherein the compression involves a compression scheme with a lower degree of information loss as a degree of application-based prioritization increases.

13. The system of claim 9, wherein allocating encoding resources to the one or more portions of the frame based at least in part on the application-based prioritization of the semantic category comprises performing a compression on the one or more portions of the frame, wherein the compression involves a compression scheme that selects one or more compression techniques that consume increasingly more processing resources as a degree of application-based prioritization increases.

14. The system of claim 9, wherein allocating encoding resources to the one or more portions of the frame based at least in part on the application-based prioritization of the semantic category comprises providing information about motion of one or more elements within the one or more regions of the frame to a codec that encodes the video stream, wherein the codec uses the information about the motion of the one or more elements to improve a fidelity of the one or more elements within the video stream.

15. The system of claim 9, wherein the computer-executable instructions further cause the physical processor to encode the frame using the allocated encoding resources and transmit the video stream with the encoded frame in real-time.

16. The system of claim 9, wherein the computer-executable instructions further cause the physical processor to:

identify one or more encoding parameters resulting from the allocated encoding resources used to encode the frame; and transmit the one or more encoding parameters to a client system that receives the video stream for decoding the frame.

17. The system of claim 9, wherein allocating encoding resources to the one or more portions of the frame that based at least in part on the application-based prioritization of the semantic category comprises encoding blocks of the frame sequentially, wherein a number of bits targeted for encoding each successive block is determined based on:

a target number of bits for the frame;

a number of bits already consumed in encoding blocks of the frame; and an application-based prioritization for each given block based on an application-based prioritization of one or more semantic categories associated with each given block.

18. A non-transitory computer-readable medium comprising one or more computer-executable instructions that, when executed by at least one processor of a computing device, cause the computing device to:

receive a video stream, associated with an application, for encoding;

label one or more regions of a frame within the video stream with a semantic category;

determine, based at least in part on a mapping between the application with which the video stream is associated and the semantic category, an application-based prioritization of the semantic category for the application;

allocate encoding resources to one or more portions of the frame that comprise at least a part of the one or more regions of the frame based at least in part on the application-based prioritization of the semantic category for the application;

receive an additional video stream for encoding;

determine that the additional video stream is associated with an additional application;

analyze the additional video stream to label one or more additional regions of an additional frame within the additional video stream with the semantic category; and determine, based at least in part on a mapping between the additional application with which the additional video stream is associated and the semantic category, an additional application-based prioritization of the semantic category for the application, the additional application-based prioritization of the semantic category differing from the application-based prioritization of the semantic category based at least in part on the mapping between the additional application and the semantic category differing from the mapping between the application and the semantic category.

* * * * *